US012771445B2

(12) United States Patent
Nakano

(10) Patent No.: US 12,771,445 B2
(45) Date of Patent: Oct. 20, 2026

(54) OPTICAL PATH STATE ASSESSMENT DEVICE, OPTICAL TRANSMISSION SYSTEM, OPTICAL PATH STATE ASSESSMENT METHOD, AND PROGRAM RECORD MEDIUM

(71) Applicant: NEC Corporation, Tokyo (JP)

(72) Inventor: Takehiro Nakano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 269 days.

(21) Appl. No.: 18/687,486

(22) PCT Filed: Sep. 13, 2021

(86) PCT No.: PCT/JP2021/033452

§ 371 (c)(1),
(2) Date: Feb. 28, 2024

(87) PCT Pub. No.: WO2023/037532

PCT Pub. Date: Mar. 16, 2023

(65) Prior Publication Data

US 2024/0356637 A1 Oct. 24, 2024

(51) Int. Cl.
*H04B 10/079* (2013.01)
*H04B 10/25* (2013.01)

(52) U.S. Cl.
CPC ......... *H04B 10/0795* (2013.01); *H04B 10/25* (2013.01)

(58) Field of Classification Search
CPC .. H04B 10/0795; H04B 10/25; H04B 10/075; H04B 10/27
See application file for complete search history.

(56) References Cited

U.S. PATENT DOCUMENTS

| | | | | |
|---|---|---|---|---|
| 6,911,645 B2 * | 6/2005 | Beger | .................... | H04B 10/66 250/214 R |
| 7,016,607 B1 * | 3/2006 | Carrick | .............. | H04Q 11/0062 398/58 |
| 7,046,929 B1 * | 5/2006 | Hester | ................ | H04B 10/0771 398/1 |

(Continued)

FOREIGN PATENT DOCUMENTS

| | | |
|---|---|---|
| JP | 2002171584 A * | 6/2002 |
| JP | 2004-207863 A | 7/2004 |

(Continued)

OTHER PUBLICATIONS

International Search Report for PCT Application No. PCT/JP2021/033452, mailed on Nov. 22, 2021.

(Continued)

*Primary Examiner* — David C Payne
*Assistant Examiner* — Mohammed Abdelraheem

(57) ABSTRACT

Because the reliability of an optical transmission system that uses an optical path switching device is reduced when a configuration is adopted in which the switching state of the optical path in the optical path switching device can be ascertained, this optical path state assessment device has: an optical acceptance unit configured to connect to an optical transmission line through which propagation light propagates in a latter stage of an optical path switching device for switching the path of signal light; an optical spectrum generation unit for generating optical spectrum information of the propagation light; and, a switching state assessment unit for assessing the switching state of the optical path switching device from the optical spectrum information.

20 Claims, 6 Drawing Sheets

(56) References Cited

U.S. PATENT DOCUMENTS

| | | | | |
|---|---|---|---|---|
| 8,509,621 | B2 * | 8/2013 | Boertjes | H04J 14/0212 398/83 |
| 9,031,404 | B2 * | 5/2015 | Wagener | H04J 14/0212 398/34 |
| 9,112,604 | B2 * | 8/2015 | Gariepy | H04B 10/07953 |
| 9,680,569 | B2 * | 6/2017 | Archambault | H04J 14/02122 |
| 9,680,570 | B2 * | 6/2017 | Wagener | H04B 10/07957 |
| 10,491,324 | B2 * | 11/2019 | Al Sayeed | H04J 14/0287 |
| 10,686,544 | B2 * | 6/2020 | Birk | H04J 14/0257 |
| 2002/0114035 | A1 * | 8/2002 | Graves | H04Q 11/0005 398/19 |
| 2003/0066953 | A1 * | 4/2003 | Kwon | H04B 10/077 250/227.18 |
| 2012/0301137 | A1 * | 11/2012 | Sakamoto | H04J 14/0204 398/16 |
| 2015/0295674 | A1 * | 10/2015 | Inoue | H04J 14/0287 398/83 |
| 2016/0065303 | A1 * | 3/2016 | Shang | H04J 14/0272 398/34 |
| 2018/0102842 | A1 * | 4/2018 | Rasmussen | H04B 10/0775 |

FOREIGN PATENT DOCUMENTS

| | | | | |
|---|---|---|---|---|
| JP | 2008-167243 | A | 7/2008 | |
| JP | 2012-244530 | A | 12/2012 | |
| JP | 2018-078452 | A | 5/2018 | |
| JP | 2019-176297 | A | 10/2019 | |
| WO | WO-03030413 | A2 * | 4/2003 | H04B 10/0793 |
| WO | WO-2011139757 | A1 * | 11/2011 | H04J 14/0217 |
| WO | WO-2019170873 | A1 * | 9/2019 | H04B 10/0795 |

OTHER PUBLICATIONS

English translation of Written opinion for PCT Application No. PCT/JP2021/033452, mailed on Nov. 22, 2021.

* cited by examiner

OPTICAL PATH STATE ASSESSMENT DEVICE, OPTICAL TRANSMISSION SYSTEM, OPTICAL PATH STATE ASSESSMENT METHOD, AND PROGRAM RECORD MEDIUM

This application is a National Stage Entry of PCT/JP2021/033452 filed on Sep. 13, 2021, the contents of all of which are incorporated herein by reference, in their entirety.

TECHNICAL FIELD

The present invention relates to an optical path state assessment device, an optical path state assessment method, and a program record medium, and, particularly, relates to an optical path state assessment device, an optical path state assessment method, and a program record medium that are used in an optical submarine cable system.

BACKGROUND ART

An optical submarine cable system connecting continents with an optical fiber serves an important role as an infrastructure that supports an international communication network. The optical submarine cable system is constituted of a submarine cable accommodating an optical fiber, a submarine repeater equipped with an optical amplifier, a submarine branching device that branches an optical signal, a terminal station device installed at a landing station, and the like. One example of such an optical submarine cable system is described in PTL 1.

CITATION LIST

Patent Literature

PTL 1: Japanese Unexamined Patent Application Publication No. 2018-078452

SUMMARY OF INVENTION

Technical Problem

In recent years, an optical submarine cable system has generally adopted a configuration of introducing an optical path switching device such as an optical switch into an optical transmission line, and being capable of switching the optical transmission line. In such an optical transmission system being capable of switching an optical transmission line, a method of receiving a notification from an optical path switching device in order to ascertain an optical path state is general.

Meanwhile, in an optical submarine cable system, high reliability of a device is required, and there is a limit to the number of components mounted in a housing. However, in order to ascertain a switching state of an optical path in an optical path switching device installed on a seabed, it is necessary to implement a communication function with a terminal station device in the optical path switching device. Thus, the number of components of the optical path switching device increases, and reliability of an optical transmission system using the optical path switching device is reduced.

In this way, there is a problem that reliability of an optical transmission system using an optical path switching device is reduced when a configuration is adopted in which a switching state of an optical path in the optical path switching device can be ascertained.

An object of the present invention is to provide an optical path state assessment device, an optical path state assessment method, and a program record medium that solve a problem that reliability of an optical transmission system that uses an optical path switching device is reduced when a configuration is adopted in which a switching state of an optical path in the optical path switching device can be ascertained.

Solution to Problem

An optical path state assessment device according to the present invention includes: an optical receiving means for connecting to an optical transmission line through which propagation light propagates in a latter stage of an optical path switching device that switches a path of signal light: an optical spectrum generation means for generating optical spectrum information of the propagation light: and a switching state assessment means for assessing a switching state of the optical path switching device from the optical spectrum information.

An optical path state assessment method according to the present invention includes: receiving propagation light propagating through an optical transmission line in a latter stage of an optical path switching device that switches a path of signal light: generating optical spectrum information of the propagation light: and assessing a switching state of the optical path switching device from the optical spectrum information.

A program record medium according to the present invention is a computer-readable program record medium recording a program for causing a computer to execute: a procedure of generating optical spectrum information of propagation light propagating through an optical transmission line in a latter stage of an optical path switching device that switches a path of signal light: and a procedure of assessing a switching state of the optical path switching device from the optical spectrum information.

Advantageous Effects of Invention

An optical path state assessment device, an optical path state assessment method, and a program record medium according to the present invention are able to ascertain a switching state of an optical path in an optical path switching device without causing reduction in reliability of an optical transmission system using the optical path switching device.

EXAMPLE EMBODIMENT

Example embodiments of the present invention are described below with reference to the drawings.

First Example Embodiment

Figure 1:
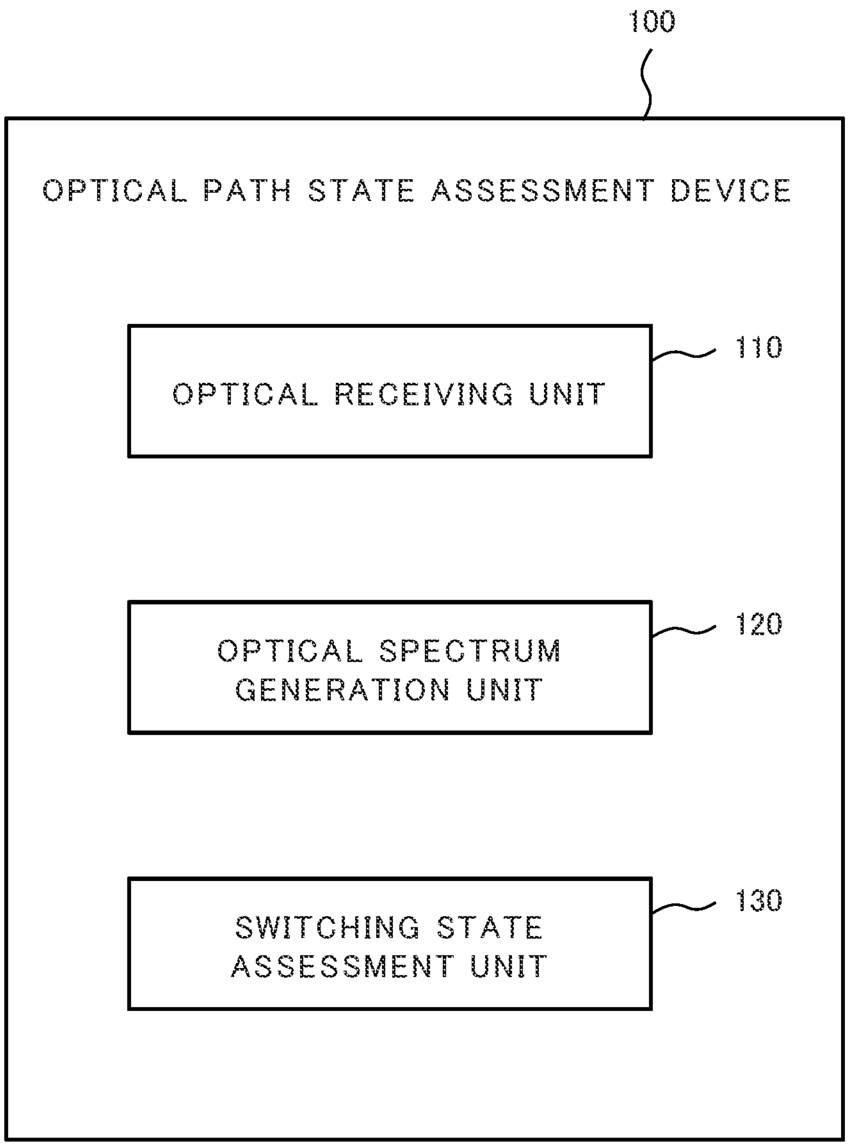
FIG. 1 is a block diagram illustrating a configuration of an optical path state assessment device according to a first example embodiment of the present invention.

FIG. 1 is a block diagram illustrating a configuration of an optical path state assessment device 100 according to the first example embodiment of the present invention. The optical path state assessment device 100 includes an optical receiving unit (optical receiving means) 110, an optical spectrum generation unit (optical spectrum generation means) 120, and a switching state assessment unit (switching state assessment means) 130. The optical path state assessment device 100 is preferably used in a terminal station device constituting an optical submarine cable system.

Figure 2:
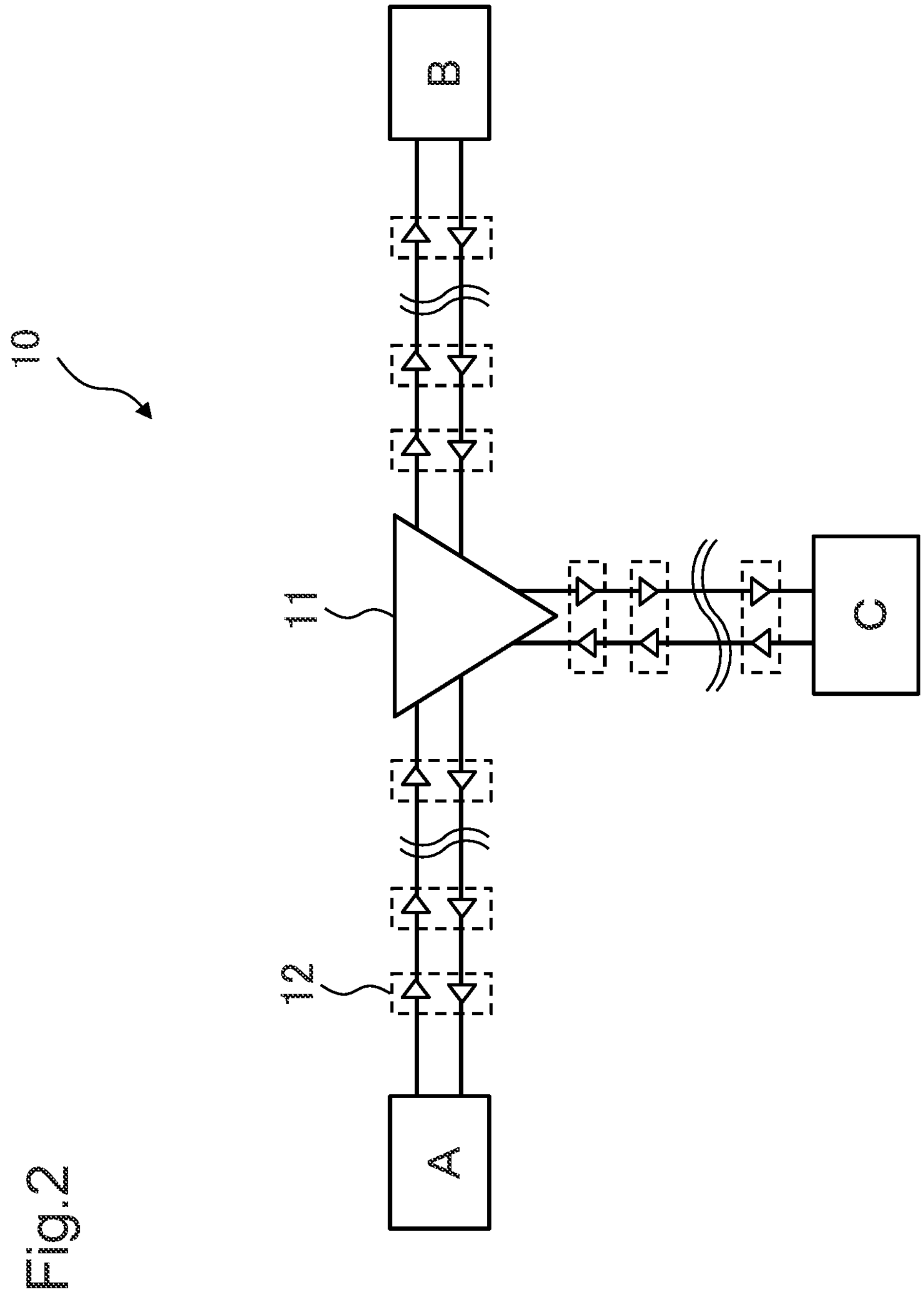
FIG. 2 is a block diagram illustrating one example of a configuration of an optical submarine cable system using an optical path state assessment device according to the first example embodiment of the present invention.

FIG. 2 illustrates, as one example of an optical submarine cable system, a configuration of an optical submarine cable system 10 including terminal stations A, B, and C each provided with a terminal station device, an optical path switching device 11, and an optical repeater 12. The optical path switching device 11 typically includes an optical switch or an optical add-drop multiplexer (OADM). Moreover, the optical repeater 12 typically includes an erbium doped fiber amplifier (EDFA). The optical path switching device 11 and the terminal station device included in each of the terminal stations A, B, and C are connected by, for example, a fiber pair. Herein, the fiber pair (FP) is constituted of an optical fiber for uplink and an optical fiber for downlink.

The optical receiving unit 110 is configured in such a way as to connect to an optical transmission line through which propagation light propagates in a latter stage of an optical path switching device that switches a path of signal light. The optical spectrum generation unit 120 generates optical spectrum information of propagation light. Then, the switching state assessment unit 130 assesses a switching state of the optical path switching device from the optical spectrum information.

In this way, in the optical path state assessment device 100 according to the present example embodiment, a configuration is adopted in which the switching state assessment unit 130 assesses a switching state of the optical path switching device from the optical spectrum information of the propagation light generated by the optical spectrum generation unit 120. Thus, it is not necessary to acquire a notification or a response from the optical path switching device in order to assess a switching state of the optical path switching device. As a result, the number of constituent members of the optical path switching device can be decreased, and reliability can be heightened. In other words, the optical path state assessment device 100 according to the present example embodiment can ascertain a switching state of an optical path in an optical path switching device without causing a reduction in reliability of an optical transmission system that uses the optical path switching device. Moreover, the optical path state assessment device 100 according to the present example embodiment is capable of assessing a switching state of the optical path switching device even when communication traffic is in an operating state.

Meanwhile, in an optical submarine cable system, an open cable method in which a transponder with an open specification is individually procured is progressing. Even in such an optical submarine cable system by the open cable method, the optical path state assessment device 100 according to the present example embodiment is capable of providing a path switching assessment function that does not depend on an information communication device such as a transponder.

A configuration can be adopted in which the switching state assessment unit 130 assesses, based on optical spectrum information, whether propagation light includes specific light. In this instance, when determining that the propagation light includes the specific light, the switching state assessment unit 130 assesses that the optical path switching device 11 is in a first switching state where signal light is sent to the optical receiving unit 110. Meanwhile, when determining that the propagation light does not include the specific light, the switching state assessment unit 130 assesses that the optical path switching device 11 is in a second switching state where signal light is sent to other than the optical receiving unit 110.

Herein, it can be assumed that the specific light is at least one of signal light and amplified spontaneous emission light. The signal light is, for example, wavelength division multiplexing (WDM) light including modulated light for communication and dummy light for level adjustment. Moreover, amplified spontaneous emission light is typically amplified spontaneous emission (ASE) light output by an erbium doped fiber amplifier (EDFA) included in the optical repeater 12.

Figure 3:
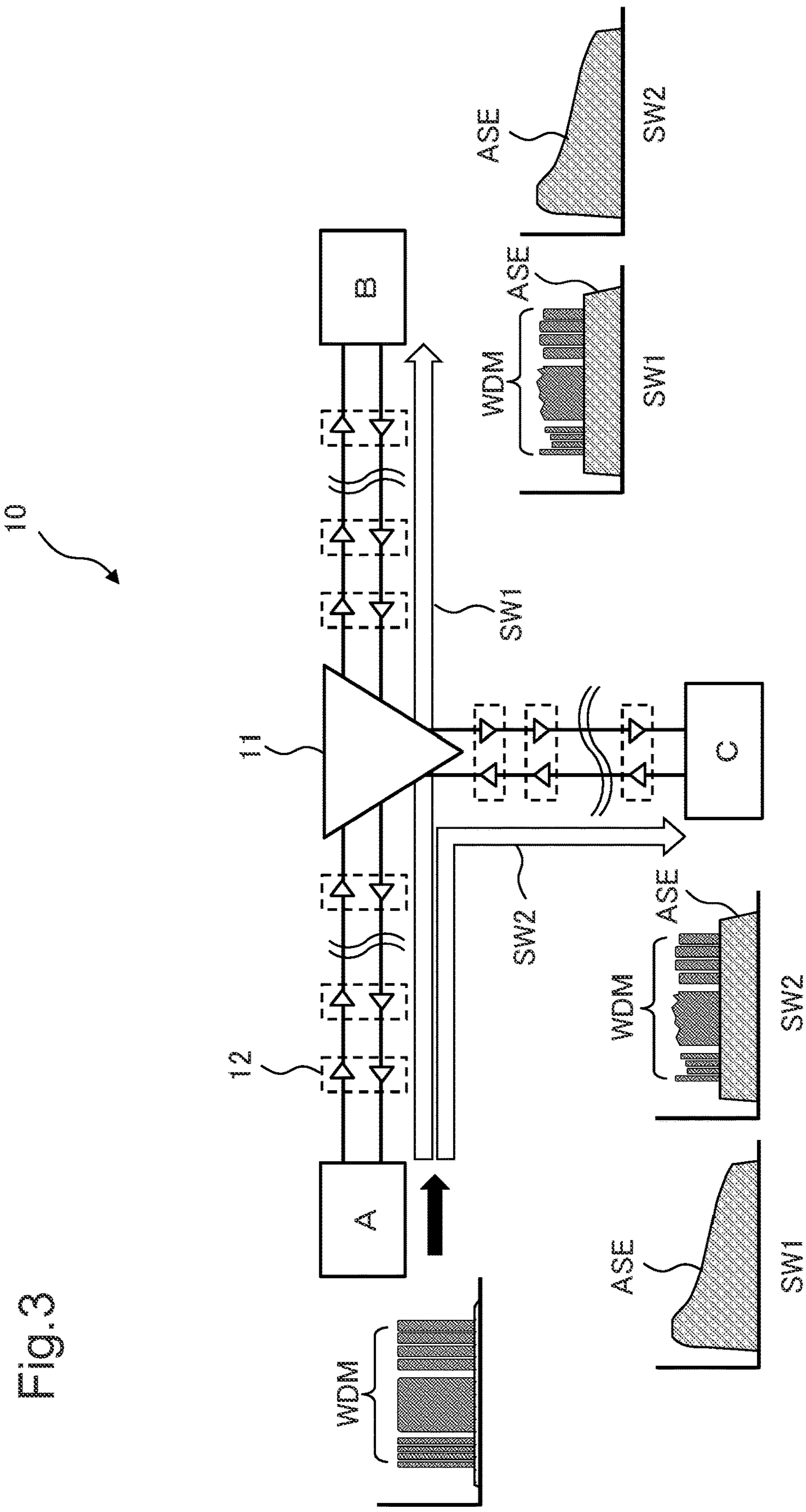
FIG. 3 is a diagram for describing a state of propagation light in an optical submarine cable system using the optical path state assessment device according to the first example embodiment of the present invention.

An example of a state of propagation light in the optical submarine cable system 10 in such a case is illustrated in FIG. 3. FIG. 3 illustrates, as an example, a case where WDM light is transmitted from the terminal station A, and WDM light is received at the terminal station B or the terminal station C via the optical path switching device 11. Herein, the optical path switching device 11 performs an operation of switching an output destination of input light from the terminal station A to a direction of the terminal station B or the terminal station C, and not performing light output in an unselected direction.

In this case, when determining that propagation light includes both the signal light and amplified spontaneous emission light, the switching state assessment unit 130 assesses that the optical path switching device 11 is in the first switching state. In the example illustrated in FIG. 3, when propagation light includes both WDM light and ASE light, the switching state assessment unit 130 of the optical path state assessment device 100 included in the terminal station B assesses that the optical path switching device 11 is in a first switching state SW1 where the signal light from the terminal station A is sent to the terminal station B.

Moreover, when determining that the propagation light does not include signal light, the switching state assessment unit 130 assesses that the optical path switching device 11 is in the second switching state. In the example illustrated in FIG. 3, when propagation light does not include WDM light, for example, when only ASE light is included, the switching state assessment unit 130 included in the terminal station B assesses that the optical path switching device 11 is in a second switching state SW2 where signal light from the terminal station A is sent to the terminal station C. Note that, the switching state assessment unit 130 of the optical path state assessment device 100 included in the terminal station C also performs a similar operation.

Figure 4:
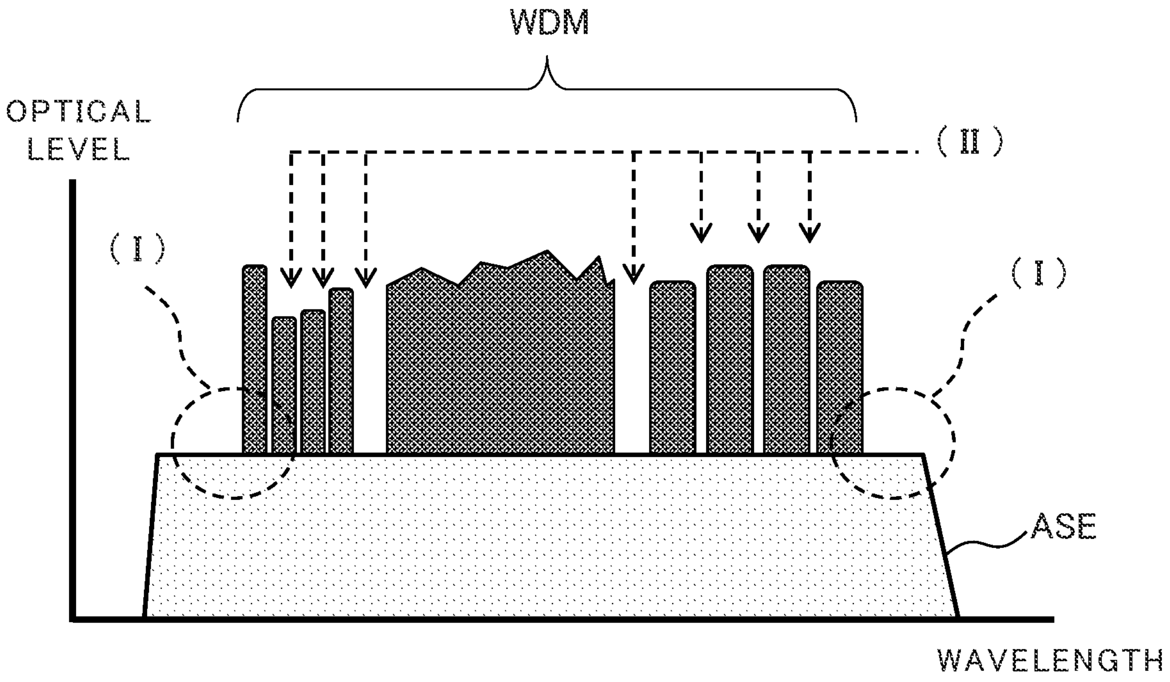
FIG. 4 is a diagram for describing an operation of a switching state assessment unit included in the optical path state assessment device according to the first example embodiment of the present invention.
Figure 5:
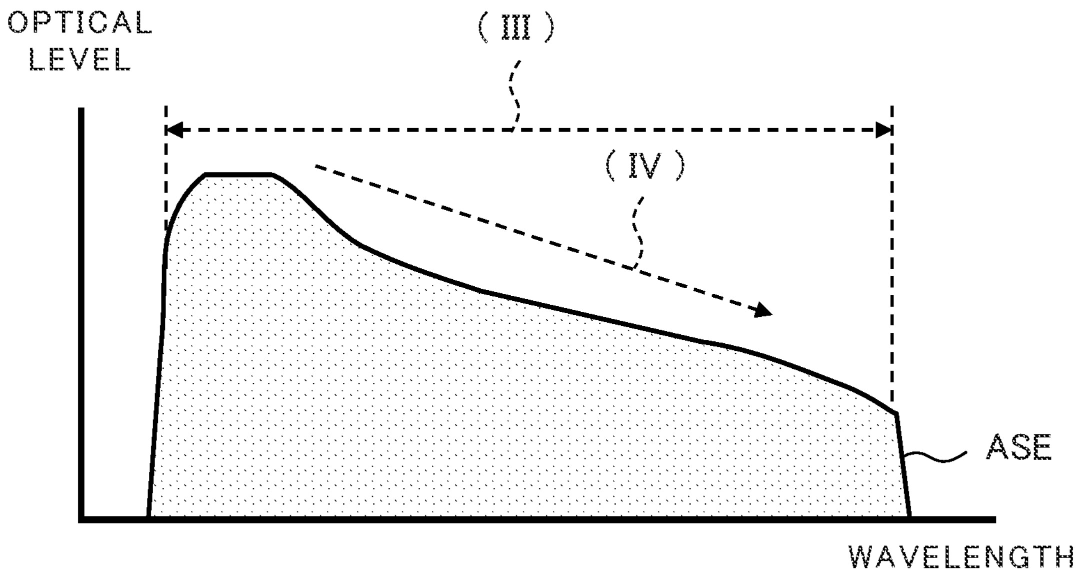
FIG. 5 is a diagram for describing another operation of the switching state assessment unit included in the optical path state assessment device according to the first example embodiment of the present invention.

An operation of the switching state assessment unit 130 in this instance is described in further detail by use of FIGS. 4 and 5.

FIG. 4 illustrates an example of a case where, in wavelength dependency of an optical level of propagation light included in optical spectrum information, a discontinuous difference has occurred in an optical level over an entirety of a wavelength band of propagation light. In this case, the switching state assessment unit 130 determines that the propagation light includes both signal light (WDM) and amplified spontaneous emission light (ASE).

Specifically, for example, as illustrated in (I) in FIG. 4, when a step has occurred between optical levels of ASE light and WDM light near both ends of an optical spectrum, the switching state assessment unit 130 determines that propagation light includes both WDM light and ASE light. Moreover, as illustrated in (II) in FIG. 4, there is a case where a step that reduces an optical level to a noise level has occurred between pieces of signal light of wavelengths each included in the WDM light, or a case where a level difference being equal to or more than a certain level has occurred. In such a case, the switching state assessment unit 130 may determine that propagation light includes both WDM light and ASE light.

FIG. 5 illustrates an example of a case where, in wavelength dependency of an optical level of propagation light included in optical spectrum information, an optical level continuously changes over an entirety of a wavelength band of propagation light. In this case, the switching state assessment unit 130 determines that the propagation light does not include signal light.

Specifically, for example, as illustrated in (III) in FIG. 5, when a spectrum having an entirely smooth shape and no locally excessive level reduction is acquired, the switching state assessment unit 130 determines that propagation light does not include signal light. Moreover, for example, when an optical repeater is controlled in such a way that output is constant, an optical spectrum in which an optical level on a long wavelength side is reduced as illustrated by (IV) in FIG. 5, and a tilt amount and a deviation in this instance have constant values is acquired. In such a case, the switching state assessment unit 130 may determine that the propagation light does not include signal light. Further, when a characteristic optical spectrum is acquired in a shape of an occupied area of the optical spectrum (distribution position, area, and the like), the switching state assessment unit 130 may determine that the propagation light does not include signal light.

In the above description, it is assumed that the specific light is at least one of signal light and amplified spontaneous emission light. However, the present invention is not limited to this, and the specific light may be an identification signal whose spectrum shape inserted in one of the optical path switching device 11 and a former stage of the optical path switching device 11 is shaped. In this case, a configuration can be adopted in which the switching state assessment unit 130 determines, based on optical spectrum information, whether propagation light includes an identification signal as the specific light.

Moreover, it may be assumed that, when determining, from the optical spectrum information, that propagation light includes only amplified spontaneous emission light, the switching state assessment unit 130 assesses a switching state from alarm information indicating occurrence of a failure and the optical spectrum information. By adopting such a configuration, it becomes possible to ascertain a switching state of an optical path in the optical path switching device, in such a way as to distinguish from a case where a failure such as middle cutoff of an optical transmission line occurs.

It may be assumed that the switching state assessment unit 130 assesses that the optical path switching device 11 is in a switching state where signal light is sent to other than the optical receiving unit 110, when determining from optical spectrum information that it is in a no-signal state. There is a case where, when no optical repeater is arranged in a latter stage of an optical path switching device, no ASE light is generated, and the optical receiving unit 110 is in a no-signal state. Even in such a case, by adopting the above configuration, the optical path state assessment device 100 is capable of ascertaining a switching state of an optical path in the optical path switching device.

In the above description, a configuration is adopted in which the switching state assessment unit 130 included in the optical path state assessment device 100 determines, based on optical spectrum information, whether propagation light includes the specific light, and assesses, from a result of the determination, a switching state of the optical path switching device. However, the present invention is not limited to this, and a configuration may be adopted in which the switching state assessment unit 130 derives an optical spectrum shape of propagation light from optical spectrum information, and assesses a switching state from the optical spectrum shape. In this case, a configuration can be adopted in which the switching state assessment unit 130 assesses a switching state by use of a discrimination algorithm by machine learning.

Next, an optical path state assessment method according to the present example embodiment is described.

In the optical path state assessment method according to the present example embodiment, first, propagation light propagating through an optical transmission line in a latter stage of an optical path switching device that switches a path of signal light is received. Next, optical spectrum information of the propagation light is generated. Then, a switching state of the optical path switching device is assessed from the optical spectrum information.

In this way, in the optical path state assessment method according to the present example embodiment, a configuration is adopted in which a switching state of the optical path switching device is assessed from optical spectrum information of propagation light. Thus, it is not necessary to acquire a notification or a response from the optical path switching device in order to assess a switching state of the optical path switching device. As a result, the number of constituent members of the optical path switching device can be decreased, and reliability can be heightened.

Herein, a configuration can be adopted in which assessing a switching state described above includes determining, based on optical spectrum information, whether propagation light includes the specific light. Then, it is assessed that the optical path switching device in a first switching state where the signal light is sent to the optical transmission line, when it is determined that the propagation light includes the specific light described above. Meanwhile, a configuration can be adopted in which it is assessed that the optical path switching device is in a second switching state where signal light is sent to other than the optical transmission line described above, when it is determined that the propagation light does not include the specific light.

It can be assumed that the specific light described above is at least one of signal light and amplified spontaneous emission light. In this case, at assessment of a switching state, it is assessed that the optical path switching device is in a first switching state, when it is determined that propagation light includes both the signal light and the amplified spontaneous emission light. Moreover, it is assessed that the optical path switching device is in a second switching state, when it is determined that the propagation light does not include the signal light.

In this instance, when, in wavelength dependency of an optical level of propagation light included in optical spectrum information, a discontinuous difference has occurred in an optical level over an entirety of a wavelength band of propagation light, it can be determined that the propagation light includes both signal light and amplified spontaneous emission light. Moreover, at assessment of a switching state, when, in wavelength dependency of an optical level of propagation light included in optical spectrum information, an optical level continuously changes over an entirety of a wavelength band of propagation light, it can be determined that the propagation light does not include signal light.

In the above description, it is assumed that the specific light is at least one of signal light and amplified spontaneous emission light. However, the present invention is not limited to this, and the specific light can be an identification signal whose spectrum shape inserted in one of the optical path switching device and a former stage of the optical path switching device is shaped.

It may be assumed that, at assessment of a switching state, when it is determined from optical spectrum information that propagation light includes only amplified spontaneous emission light, a switching state is assessed from alarm information indicating occurrence of a failure and the optical spectrum information. Moreover, it may be assumed that, at assessment of a switching state, it is assessed that the optical path switching device is in a switching state where signal light is sent to other than an optical transmission line, when it is determined from optical spectrum information that it is in a no-signal state.

In the above description, it is assumed that, at assessment of a switching state, whether the propagation light includes the specific light is determined based on optical spectrum information. However, the present invention is not limited to this, and it may be assumed that, at assessment of a switching state, an optical spectrum shape of propagation light is derived from optical spectrum information, and a switching state is assessed from the optical spectrum shape. In this instance, it can be assumed that, at assessment of a switching state, a switching state is assessed by use of a discrimination algorithm by machine learning.

Moreover, it may be assumed that each of the steps described above is executed by a computer. In other words, use can be made of a program for causing a computer to execute a procedure of generating optical spectrum information of propagation light propagating through an optical transmission line in a latter stage of an optical path switching device that switches a path of signal light: and a procedure of assessing a switching state of the optical path switching device from the optical spectrum information. Then, a computer-readable program record medium recording the program can be used. Herein, a program record medium can be a non-transitory computer readable medium. A program record medium includes a magnetic record medium, a magneto-optical record medium, an optical disk memory, a semiconductor memory, and the like.

It can be assumed that the procedure of assessing a switching state described above includes a procedure of determining, based on optical spectrum information, whether propagation light includes the specific light. Herein, there is included a procedure of assessing that the optical path switching device is in the first switching state where signal light is sent to an optical transmission line described above, when determining that propagation light includes the specific light. Meanwhile, it can be assumed that, there is included a procedure of assessing that the optical path switching device is in a second switching state where signal light is sent to other than the optical transmission line described above, when determining that propagation light does not include the specific light.

Moreover, it may be assumed that the procedure of assessing a switching state described above includes a procedure of deriving an optical spectrum shape of propagation light from optical spectrum information, and assessing a switching state from the optical spectrum shape. In this case, it can be assumed that the procedure of assessing a switching state may include a procedure of assessing a switching state by use of a discrimination algorithm by machine learning.

As described above, the optical path state assessment device 100, the optical path state assessment method, and the program record medium according to the present example embodiment can ascertain a switching state of an optical path in an optical path switching device without causing a reduction in reliability of an optical transmission system that uses the optical path switching device.

Second Example Embodiment

Figure 6:
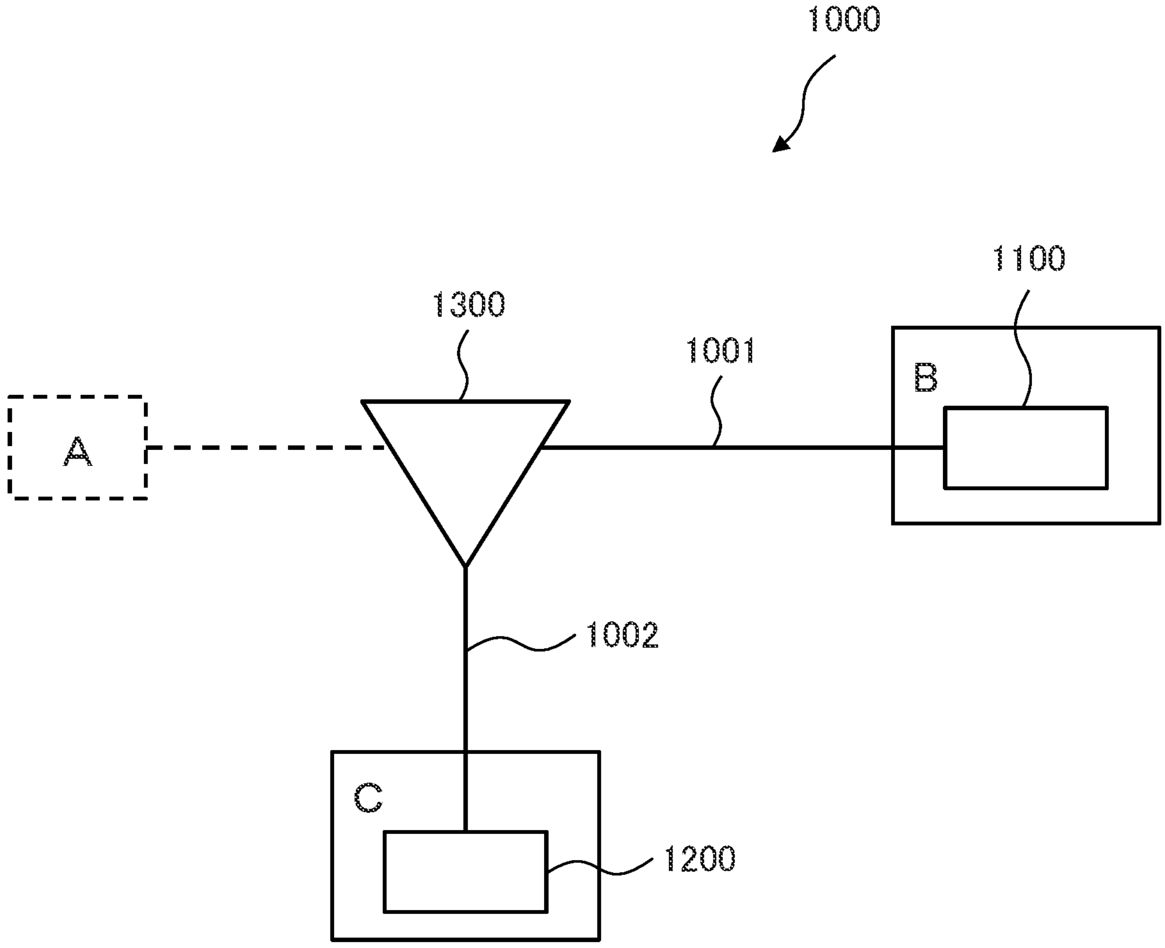
FIG. 6 is a block diagram illustrating a configuration of an optical transmission system according to a second example embodiment of the present invention.

Next, a second example embodiment of the present invention is described. FIG. 6 illustrates a configuration of an optical transmission system 1000 according to the present example embodiment. The optical transmission system 1000 includes a first optical path state assessment device 1100, a second optical path state assessment device 1200, and an optical path switching device 1300. The optical transmission system 1000 is preferably used in an optical submarine cable system.

The first optical path state assessment device 1100 and the second optical path state assessment device 1200 can each be an optical path state assessment device 100 according to the first example embodiment. In other words, each of the first optical path state assessment device 1100 and the second optical path state assessment device 1200 includes an optical receiving unit 110, an optical spectrum generation unit 120, and a switching state assessment unit 130 (see FIG. 1).

As described in the first example embodiment, the optical path state assessment device 100 adopts a configuration in which the switching state assessment unit 130 assesses a switching state of an optical path switching device from optical spectrum information of propagation light generated by the optical spectrum generation unit 120. Thus, it is not necessary to acquire a notification or a response from the optical path switching device in order to assess a switching state of the optical path switching device. As a result, the number of constituent members of the optical path switching device can be decreased, and reliability can be heightened.

Each of the first optical path state assessment device 1100 and the second optical path state assessment device 1200 is preferably used in a terminal station device included in a terminal station (a terminal station B and a terminal station C in an example of FIG. 6) constituting an optical submarine cable system.

The optical path switching device 1300 typically includes an optical switch or an optical add-drop multiplexer (OADM). Herein, in the example illustrated in FIG. 6, the optical path switching device 1300 performs an operation of switching an output destination of input light from a terminal station A to a direction of the terminal station B or the terminal station C, and not performing light output in an unselected direction. The optical path switching device 1300 and the first optical path state assessment device 1100 are connected by an optical transmission line 1001, and the optical path switching device 1300 and the second optical path state assessment device 1200 are connected by an optical transmission line 1002. The optical transmission lines 1001 and 1002 are typically a fiber pair constituted of an optical fiber for uplink and an optical fiber for downlink.

Herein, the first optical path state assessment device 1100 generates first optical spectrum information being optical spectrum information. Moreover, the second optical path state assessment device 1200 generates second optical spectrum information being optical spectrum information.

In this instance, a configuration can be adopted in which the first optical path state assessment device 1100 and the second optical path state assessment device 1200 assess a switching state of the optical path switching device 1300 from at least one of the first optical spectrum information and the second optical spectrum information. In other words, a configuration can be adopted in which a switching state is assessed by use of one of the first optical spectrum information and the second optical spectrum information, or both the first optical spectrum information and the second optical spectrum information.

Specifically, for example, a configuration can be adopted in which, when a plurality of the optical path switching devices 1300 are arranged in the optical transmission line 1001 connected to the terminal station B, and another optical path switching device is not arranged in the optical transmission line 1002 connected to the terminal station C, a switching state is assessed only from the second optical spectrum information. Moreover, a configuration may be adopted in which, when a plurality of the optical path switching devices 1300 are arranged in each of the optical transmission line 1001 connected to the terminal station B and the optical transmission line 1002 connected to the terminal station C, a switching state is assessed by use of both of the first optical spectrum information and the second optical spectrum information.

A configuration can be adopted in which the optical transmission system 1000 further includes a network management device (not illustrated). The network management device acquires first optical spectrum information from the first optical path state assessment device 1100, and acquires second optical spectrum information from the second optical path state assessment device 1200. Then, a configuration can be adopted in which the network management device assesses a switching state of the optical path switching device 1300, based on the first optical spectrum information and the second optical spectrum information.

Next, an optical path state assessment method according to the present example embodiment is described.

In the optical path state assessment method according to the present example embodiment, first, propagation light propagating through an optical transmission line in a latter stage of an optical path switching device that switches a path of signal light is received. Next, optical spectrum information of the propagation light is generated. Then, a switching state of the optical path switching device is assessed from the optical spectrum information. The configuration up to this point is similar to that of the optical path state assessment method according to the first example embodiment.

In the optical path state assessment method according to the present example embodiment, when optical spectrum information is generated, the first optical spectrum information being optical spectrum information of first propagation light being propagation light is generated. Then, a configuration is adopted in which second optical spectrum information being optical spectrum information of second propagation light being propagation light is generated.

In this instance, a configuration can be adopted in which, at assessment of a switching state, a switching state is assessed from at least one of the first optical spectrum information and the second optical spectrum information.

Moreover, it may be assumed that the first optical spectrum information is sent to the network management device, and the second optical spectrum information is sent to the network management device, in such a way that the network management device assesses a switching state, based on the first optical spectrum information and the second optical spectrum information.

As described above, the optical transmission system 1000 and the optical path state assessment method according to the present example embodiment can ascertain a switching state of an optical path in an optical path switching device without causing a reduction in reliability of an optical transmission system that uses the optical path switching device.

Some or all of the above-described example embodiments can also be described as, but are not limited to, the following supplementary notes.

Supplementary Note 1

An optical path state assessment device including: an optical receiving means for connecting to an optical transmission line through which propagation light propagates in a latter stage of an optical path switching device that switches a path of signal light: an optical spectrum generation means for generating optical spectrum information of the propagation light: and a switching state assessment means for assessing a switching state of the optical path switching device from the optical spectrum information.

Supplementary Note 2

The optical path state assessment device according to supplementary note 1, wherein the switching state assessment means determines, based on the optical spectrum information, whether the propagation light includes specific light, assesses that the optical path switching device is in a first switching state where the signal light is sent to the optical receiving means, when determining that propagation light includes the specific light, and assesses that the optical path switching device is in a second switching state where the signal light is sent to other than the optical receiving means, when determining that the propagation light does not include the specific light.

Supplementary Note 3

The optical path state assessment device according to supplementary note 2, wherein the specific light is at least one of the signal light and amplified spontaneous emission light, and the switching state assessment means assesses that the optical path switching device is in a first switching state, when determining that the propagation light includes both the signal light and the amplified spontaneous emission light, and assesses that the optical path switching device is in a second switching state, when determining that the propagation light does not include the signal light.

Supplementary Note 4

The optical path state assessment device according to supplementary note 3, wherein, when, in wavelength dependency of an optical level of the propagation light included in the optical spectrum information, a discontinuous difference occurs in the optical level over entirety of a wavelength band of the propagation light, the switching state assessment means determines that the propagation light includes both the signal light and the amplified spontaneous emission light.

Supplementary Note 5

The optical path state assessment device according to supplementary note 3, wherein, when, in wavelength dependency of an optical level of the propagation light included in the optical spectrum information, the optical level continuously changes over entirety of a wavelength band of the propagation light, the switching state assessment means determines that the propagation light does not include the signal light.

Supplementary Note 6

The optical path state assessment device according to supplementary note 2, wherein the specific light is an identification signal whose spectrum shape inserted in one of the optical path switching device and a former stage of the optical path switching device is shaped.

Supplementary Note 7

The optical path state assessment device according to supplementary note 1, wherein, when determining, from the optical spectrum information, that the propagation light includes only amplified spontaneous emission light, the switching state assessment means assesses the switching state from alarm information indicating occurrence of a failure and the optical spectrum information.

Supplementary Note 8

The optical path state assessment device according to supplementary note 1, wherein the switching state assessment means assesses that the optical path switching device is in a switching state where the signal light is sent to other than the optical receiving means, when determining, from the optical spectrum information, that it is in a no-signal state.

Supplementary Note 9

The optical path state assessment device according to supplementary note 1, wherein the switching state assessment means derives an optical spectrum shape of the propagation light from the optical spectrum information, and assesses the switching state from the optical spectrum shape.

Supplementary Note 10

The optical path state assessment device according to supplementary note 9, wherein the switching state assessment means assesses the switching state by use of a discrimination algorithm by machine learning.

Supplementary Note 11

An optical transmission system including: a first optical path state assessment device being the optical path state assessment device according to any one of supplementary notes 1 to 10; a second optical path state assessment device being the optical path state assessment device according to any one of supplementary notes 1 to 10; and the optical path switching device, wherein the first optical path state assessment device generates first optical spectrum information being the optical spectrum information, and the second optical path state assessment device generates second optical spectrum information being the optical spectrum information.

Supplementary Note 12

The optical transmission system according to supplementary note 11, wherein the first optical path state assessment device and the second optical path state assessment device assess the switching state from at least one of the first optical spectrum information and the second optical spectrum information.

Supplementary Note 13

The optical transmission system according to supplementary note 11, further including a network management device, wherein the network management device acquires the first optical spectrum information from the first optical path state assessment device, acquires the second optical spectrum information from the second optical path state assessment device, and assesses the switching state, based on the first optical spectrum information and the second optical spectrum information.

Supplementary Note 14

An optical path state assessment method including: receiving propagation light propagating through an optical transmission line in a latter stage of an optical path switching device that switches a path of signal light: generating optical spectrum information of the propagation light: and assessing a switching state of the optical path switching device from the optical spectrum information.

Supplementary Note 15

The optical path state assessment method according to supplementary note 14, wherein the assessing the switching state includes determining, based on the optical spectrum information, whether the propagation light includes specific light, assessing that the optical path switching device is in a first switching state where the signal light is sent to the optical transmission line, when determining that the propagation light includes the specific light, and assessing that the optical path switching device is in a second switching state where the signal light is sent to other than the optical transmission line, when determining that the propagation light does not include the specific light.

Supplementary Note 16

The optical path state assessment method according to supplementary note 15, wherein the specific light is at least one of the signal light and amplified spontaneous emission light, and the assessing the switching state includes assessing that the optical path switching device is in a first switching state, when determining that the propagation light includes both the signal light and the amplified spontaneous emission light, and assessing that the optical path switching device is in a second switching state, when determining that the propagation light does not include the signal light.

Supplementary Note 17

The optical path state assessment method according to supplementary note 16, wherein the assessing the switching state includes determining that the propagation light includes both the signal light and the amplified spontaneous emission light, when, in wavelength dependency of an optical level of the propagation light included in the optical spectrum information, a discontinuous difference occurs in the optical level over entirety of a wavelength band of the propagation light.

Supplementary Note 18

The optical path state assessment method according to supplementary note 16, wherein the assessing the switching state includes determining that the propagation light does not include the signal light, when, in wavelength dependency of an optical level of the propagation light included in the optical spectrum information, the optical level continuously changes over entirety of a wavelength band of the propagation light.

Supplementary Note 19

The optical path state assessment method according to supplementary note 15, wherein the specific light is an identification signal whose spectrum shape inserted in one of the optical path switching device and a former stage of the optical path switching device is shaped.

Supplementary Note 20

The optical path state assessment method according to supplementary note 14, wherein the assessing the switching state includes assessing the switching state from alarm information indicating occurrence of a failure and the optical spectrum information, when determining, from the optical spectrum information, that the propagation light includes only amplified spontaneous emission light.

Supplementary Note 21

The optical path state assessment method according to supplementary note 14, wherein the assessing the switching state includes assessing that the optical path switching device is in a switching state where the signal light is sent to other than the optical transmission line, when determining, from the optical spectrum information, that it is in a no-signal state.

Supplementary Note 22

The optical path state assessment method according to supplementary note 14, wherein the assessing the switching state includes deriving an optical spectrum shape of the propagation light from the optical spectrum information, and assessing the switching state from the optical spectrum shape.

Supplementary Note 23

The optical path state assessment method according to supplementary note 22, wherein the assessing the switching state includes assessing the switching state by use of a discrimination algorithm by machine learning.

Supplementary Note 24

The optical path state assessment method according to any one of supplementary notes 14 to 23, wherein the generating the optical spectrum information includes generating first optical spectrum information, being the optical spectrum information, of first propagation light being the propagation light, and generating second optical spectrum information, being the optical spectrum information, of second propagation light being the propagation light.

Supplementary Note 25

The optical path state assessment method according to supplementary note 24, wherein the assessing the switching state includes assessing the switching state from at least one of the first optical spectrum information and the second optical spectrum information.

Supplementary Note 26

The optical path state assessment method according to supplementary note 24, further including sending the first optical spectrum information to a network management device, and sending the second optical spectrum information to the network management device, in such a way that the network management device assesses the switching state, based on the first optical spectrum information and the second optical spectrum information.

Supplementary Note 27

A computer-readable program record medium recording a program for causing a computer to execute: a procedure of generating optical spectrum information of propagation light propagating through an optical transmission line in a latter stage of an optical path switching device that switches a path of signal light: and a procedure of assessing a switching state of the optical path switching device from the optical spectrum information.

Supplementary Note 28

The program record medium according to supplementary note 27, wherein the procedure of assessing the switching state includes a procedure of determining, based on the optical spectrum information, whether the propagation light includes specific light, assessing that the optical path switching device is in a first switching state where the signal light is sent to the optical transmission line, when determining that the propagation light includes the specific light, and assessing that the optical path switching device is in a second switching state where the signal light is sent to other than the optical transmission line, when determining that the propagation light does not include the specific light.

Supplementary Note 29

The program record medium according to supplementary note 27, wherein the procedure of assessing the switching state includes a procedure of deriving an optical spectrum shape of the propagation light from the optical spectrum information, and assessing the switching state from the optical spectrum shape.

Supplementary Note 30

The program record medium according to supplementary note 29, wherein the procedure of assessing the switching state includes a procedure of assessing the switching state by use of a discrimination algorithm by machine learning.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST

- 100 Optical path state assessment device
- 110 Optical receiving unit
- 120 Optical spectrum generation unit
- 130 Switching state assessment unit
- 1000 Optical transmission system
- 1001, 1002 Optical transmission line
- 1100 First optical path state assessment device
- 1200 Second optical path state assessment device
- 1300 Optical path switching device
- 10 Optical submarine cable system
- 11 Optical path switching device
- 12 Optical repeater

What is claimed is:

1. An optical path state assessment device comprising:

one or more memories storing instructions; and one or more processors configured to execute the instructions to:

receive propagation light propagating through an optical transmission line in a latter stage of an optical path switching device that switches a path of signal light;

generate optical spectrum information of the propagation light; and assess, while communication traffic through the optical transmission line is in an operating state, a switching state of the optical path switching device from the optical spectrum information, wherein the assessing includes determining which of a plurality of operational switching states the optical path switching device is in.

2. The optical path state assessment device according to claim 1, wherein the one or more processors are configured to execute the instructions to:

determine, based on the optical spectrum information, whether the propagation light includes specific light, assess that the optical path switching device is in a first switching state where the signal light is sent to the optical transmission line, when determining that propagation light includes the specific light, and assess that the optical path switching device is in a second switching state where the signal light is sent to other than the optical transmission line, when determining that the propagation light does not include the specific light.

3. The optical path state assessment device according to claim 2, wherein the specific light is at least one of the signal light and amplified spontaneous emission light, and wherein the one or more processors are configured to further execute the instructions to:

assess that the optical path switching device is in a first switching state, when determining that the propagation light includes both the signal light and the amplified spontaneous emission light, and assess that the optical path switching device is in a second switching state, when determining that the propagation light does not include the signal light.

4. The optical path state assessment device according to claim 3, wherein the one or more processors are configured to execute the instructions to, when, in wavelength dependency of an optical level of the propagation light included in the optical spectrum information, a discontinuous difference occurs in the optical level over entirety of a wavelength band of the propagation light, determine that the propagation light includes both the signal light and the amplified spontaneous emission light.

5. The optical path state assessment device according to claim 3, wherein, wherein the one or more processors are configured to execute the instructions to, when, in wavelength dependency of an optical level of the propagation light included in the optical spectrum information, the optical level continuously changes over entirety of a wavelength band of the propagation light, determine that the propagation light does not include the signal light.

6. The optical path state assessment device according to claim 2, wherein the specific light is an identification signal whose spectrum shape inserted in one of the optical path switching device and a former stage of the optical path switching device is shaped.

7. The optical path state assessment device according to claim 1, wherein the one or more processors are configured to execute the instructions to, when determining, from the optical spectrum information, that the propagation light includes only amplified spontaneous emission light, assess the switching state from alarm information indicating occurrence of a failure and the optical spectrum information.

8. The optical path state assessment device according to claim 1, wherein the one or more processors are configured to execute the instructions to assess that the optical path switching device is in a switching state where the signal light is sent to other than the optical transmission line, when determining, from the optical spectrum information, that it is in a no-signal state.

9. The optical path state assessment device according to claim 1, wherein the one or more processors are configured to execute the instructions to derive an optical spectrum shape of the propagation light from the optical spectrum information, and assesses the switching state from the optical spectrum shape.

10. The optical path state assessment device according to claim 9, wherein the one or more processors are configured to execute the instructions to assess the switching state by use of a discrimination algorithm by machine learning.

11. An optical transmission system comprising:

a first optical path state assessment device being the optical path state assessment device according to claim 1;

a second optical path state assessment device being the optical path state assessment device according to claim 1; and the optical path switching device, wherein the first optical path state assessment device generates first optical spectrum information being the optical spectrum information, and the second optical path state assessment device generates second optical spectrum information being the optical spectrum information.

12. The optical transmission system according to claim 11, wherein the first optical path state assessment device and the second optical path state assessment device assess the switching state from at least one of the first optical spectrum information and the second optical spectrum information.

13. The optical transmission system according to claim 11, further comprising a network management device, wherein the network management device acquires the first optical spectrum information from the first optical path state assessment device, acquires the second optical spectrum information from the second optical path state assessment device, and assesses the switching state, based on the first optical spectrum information and the second optical spectrum information.

14. An optical path state assessment method comprising:

by a computer;

receiving propagation light propagating through an optical transmission line in a latter stage of an optical path switching device that switches a path of signal light;

generating optical spectrum information of the propagation light; and assessing, while communication traffic through the optical transmission line is in an operating state, a switching state of the optical path switching device from the optical spectrum information, wherein the assessing includes determining which of a plurality of operational switching states the optical path switching device is in.

15. The optical path state assessment method according to claim 14, wherein the assessing the switching state includes determining, based on the optical spectrum information, whether the propagation light includes specific light, assessing that the optical path switching device is in a first switching state where the signal light is sent to the optical transmission line, when determining that the propagation light includes the specific light, and assessing that the optical path switching device is in a second switching state where the signal light is sent to other than the optical transmission line, when determining that the propagation light does not include the specific light.

16. The optical path state assessment method according to claim 15, wherein the specific light is at least one of the signal light and amplified spontaneous emission light, and the assessing the switching state includes assessing that the optical path switching device is in a first switching state, when determining that the propagation light includes both the signal light and the amplified spontaneous emission light, and assessing that the optical path switching device is in a second switching state, when determining that the propagation light does not include the signal light.

17. The optical path state assessment method according to claim 16, wherein the assessing the switching state includes determining that the propagation light includes both the signal light and the amplified spontaneous emission light, when, in wavelength dependency of an optical level of the propagation light included in the optical spectrum information, a discontinuous difference occurs in the optical level over entirety of a wavelength band of the propagation light.

18. The optical path state assessment method according to claim 16, wherein the assessing the switching state includes determining that the propagation light does not include the signal light, when, in wavelength dependency of an optical level of the propagation light included in the optical spectrum information, the optical level continuously changes over entirety of a wavelength band of the propagation light.

19. The optical path state assessment method according to claim 14, wherein the assessing the switching state includes assessing the switching state from alarm information indicating occurrence of a failure and the optical spectrum information, when determining, from the optical spectrum information, that the propagation light includes only amplified spontaneous emission light.

20. A non-transitory computer-readable program record medium recording a program for causing a computer to execute:

generating optical spectrum information of propagation light propagating through an optical transmission line in a latter stage of an optical path switching device that switches a path of signal light; and assessing, while communication traffic through the optical transmission line is in an operating state, a switching state of the optical path switching device from the optical spectrum information, wherein the assessing includes determining which of a plurality of operational switching states the optical path switching device is in.

* * * * *